United States Patent
Kim et al.

(10) Patent No.: US 11,768,400 B2
(45) Date of Patent: Sep. 26, 2023

(54) DISPLAY APPARATUS INCLUDING REFLECTIVE LAYER, METHOD OF MANUFACTURING DISPLAY APPARATUS AND BACKLIGHT UNIT

(71) Applicant: SAMSUNG ELECTRONICS CO., LTD., Suwon-si (KR)

(72) Inventors: Daesik Kim, Suwon-si (KR); Yasuhiro Nishida, Suwon-si (KR); Farid Mukhtarov, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/697,610

(22) Filed: Mar. 17, 2022

(65) Prior Publication Data

US 2022/0206337 A1 Jun. 30, 2022

Related U.S. Application Data

(63) Continuation of application No. PCT/KR2020/011642, filed on Aug. 31, 2020.

(30) Foreign Application Priority Data

Sep. 30, 2019 (KR) ........................ 10-2019-0120552

(51) Int. Cl.
*G02F 1/13357* (2006.01)
*G02F 1/1335* (2006.01)

(52) U.S. Cl.
CPC .. *G02F 1/133605* (2013.01); *G02F 1/133603* (2013.01); *G02F 1/133606* (2013.01); *G02F 1/133611* (2013.01); *G02F 1/133614* (2021.01)

(58) Field of Classification Search
CPC ......... G02F 1/133605; G02F 1/133603; G02F 1/133606; G02F 1/133611; G02F 1/133614
See application file for complete search history.

(56) References Cited

U.S. PATENT DOCUMENTS

| | | | |
|---|---|---|---|
| 7,667,787 | B2 | 2/2010 | Mahama et al. |
| 8,469,575 | B2 | 6/2013 | Weber et al. |

(Continued)

FOREIGN PATENT DOCUMENTS

| | | | |
|---|---|---|---|
| JP | 2001-67008 | A | 3/2001 |
| JP | 5213383 | B2 | 6/2013 |

(Continued)

OTHER PUBLICATIONS

Park_et_al.__KR201600763464__machine_translation_06-2016. pdf (Year: 2016).*

(Continued)

*Primary Examiner* — Tracie Y Green
(74) *Attorney, Agent, or Firm* — Sughrue Mion, PLLC

(57) ABSTRACT

Provided is a backlight unit, a display apparatus, and a method of manufacturing the display apparatus capable of securing a uniform and wide illumination area with a small number of light sources through reflection of a reflective layer. The backlight unit includes a plurality of light sources configured to emit light; a first reflective layer configured to reflect the light emitted from the plurality of light sources; and a second reflective layer configured to reflect the light reflected from the first reflective layer, wherein an amount of reflection from the first reflective layer and an amount of transmission through the first reflective layer are different from each other according to an angle of incidence of light incident on the first reflective layer.

11 Claims, 17 Drawing Sheets

(56) References Cited

U.S. PATENT DOCUMENTS

| | | | | |
|---|---|---|---|---|
| 9,638,956 B2* | 5/2017 | Kwon | ............... | G02B 6/0038 |
| 2012/0147295 A1* | 6/2012 | Kasano | ............ | G02F 1/133605 |
| | | | | 257/E33.072 |
| 2019/0056074 A1* | 2/2019 | Park | ............... | G02F 1/133605 |

FOREIGN PATENT DOCUMENTS

| | | | |
|---|---|---|---|
| KR | 10-2005-0121076 A | | 12/2005 |
| KR | 10-2007-0074951 A | | 7/2007 |
| KR | 10-2011-0023686 A | | 3/2011 |
| KR | 101335791 B1 | * | 12/2013 |
| KR | 10-2016-0076346 A | | 6/2016 |
| KR | 10-2019-0064866 A | | 6/2019 |

OTHER PUBLICATIONS

Lee_KR2007_0074951__machine_translation__07-2007.pdf (Year: 2007).*

International Search Report dated Jan. 8, 2021, issued by the International Searching Authority in International Application No. PCT/KR2020/011642 (PCT/ISA/210).

* cited by examiner

DISPLAY APPARATUS INCLUDING REFLECTIVE LAYER, METHOD OF MANUFACTURING DISPLAY APPARATUS AND BACKLIGHT UNIT

CROSS-REFERENCE TO RELATED APPLICATIONS

This application is a bypass continuation application of International Application No. PCT/KR2020/011642, filed on Aug. 31, 2020, which based on and claims priority to Korean Patent Application No. 10-2019-0120552, filed on Sep. 30, 2019, in the Korean Intellectual Property Office, the disclosures of which are incorporated by reference herein in their entireties.

BACKGROUND

1. Field

The disclosure relates to a display apparatus including a backlight unit that emits light, a method of manufacturing the display apparatus and the backlight unit.

2. Description of Related Art

In general, a display apparatus visually displays acquired or stored image information to a user, and is used in various fields such as in a home or a workplace.

The display apparatus may include a monitor apparatus connected to a personal computer (PC) or a server computer, a portable computing device, a navigation terminal device, a general television, an Internet protocol television (IPTV) device, a portable terminal such as a smart phone, a tablet PC, a personal digital assistant (PDA) or a cellular phone, a variety of display apparatuses used to reproduce images such as advertisements or movies in an industrial field, or various types of audio/video systems.

In using a plurality of light emitting diode (LED) point light sources applicable to lighting and display, an optical distance (OD: a distance from a light source to a panel) that is much shorter than the distance between the LED point light sources is generally required. The Lambertian light emitted from the LED point light sources is used with an additional optical lens to diffuse outward across a larger lateral area.

However, when an optical lens is used as above, the price for a display apparatus is undesirably increased and a manufacturing process is also inefficient, requiring research to overcome such disadvantages.

SUMMARY

The disclosure provides a display apparatus, a method of manufacturing the display apparatus and a backlight unit capable of securing a uniform and wide illumination area with a small number of light sources through reflection of a reflective layer.

In accordance with an aspect of the disclosure, there is provided a backlight unit including: a plurality of light sources configured to emit light; a first reflective layer configured to reflect the light emitted by the plurality of light sources; and a second reflective layer configured to reflect the light reflected from the first reflective layer, wherein an amount of reflection from the first reflective layer and an amount of transmission through the first reflective layer are different from each other according to an angle of incidence of light incident on the first reflective layer.

The amount of reflection may be greater than the amount of transmission when the angle of incidence is less than a predetermined angle.

The first reflective layer may define a bright spot and a dark spot formed by at least one light source of the plurality of light sources based on the amount of reflection from the first reflective layer.

The first reflective layer may define a light distribution formed by the plurality of light sources based on the predetermined angle.

The first reflective layer may include a plurality of layers, and the plurality of layers may be configured so that light of a predetermined central wavelength is reflected and light of a predetermined surrounding wavelength is transmitted.

The first reflective layer may be configured so that the predetermined angle is determined based on the predetermined central wavelength and the predetermined surrounding wavelength.

At least one of the plurality of light sources may be provided on the second reflective layer, and the second reflective layer is configured to reflect the light reflected from the first reflective layer to form a virtual light source at a position between the plurality of light sources.

The plurality of light sources may include at least one of a reflective thin film coating, a transparent mold, or a light source reflective layer.

The plurality of light sources may be provided between the first reflective layer and the second reflective layer, and the first reflective layer and the second reflective layer may be connected by a supporting member.

The first reflective layer may be formed so that a lateral position of the first reflective layer is independent of a lateral position of the at least one of the plurality of light sources.

In accordance with an aspect of the disclosure, there is provided a method of manufacturing a backlight unit of a display apparatus, the method including: providing a plurality of light sources configured to emit light between a first reflective layer configured to reflect the light emitted from the plurality of light sources and a second reflective layer configured to reflect the light reflected from the first reflective layer, wherein an amount of reflection from the first reflective layer and an amount of transmission through the first reflective layer are different from each other according to an angle of incidence of light incident on the first reflective layer.

The amount of reflection may be greater than the amount of transmission when the angle of incidence is less than a predetermined angle.

The first reflective layer may define a bright spot and a dark spot formed by the at least one of the plurality of light sources based on the amount of reflection from the first reflective layer.

The first reflective layer may define a light distribution formed by the plurality of light sources based on the predetermined angle.

The first reflective layer may include a plurality of layers, and the plurality of layers may be formed so that light of a predetermined central wavelength is reflected and light of a predetermined surrounding wavelength is transmitted.

According to embodiments of the disclosure, the display apparatus, the method of manufacturing the display apparatus and the backlight unit may secure a uniform and wide illumination area with a small number of light sources through reflection of a reflective layer.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
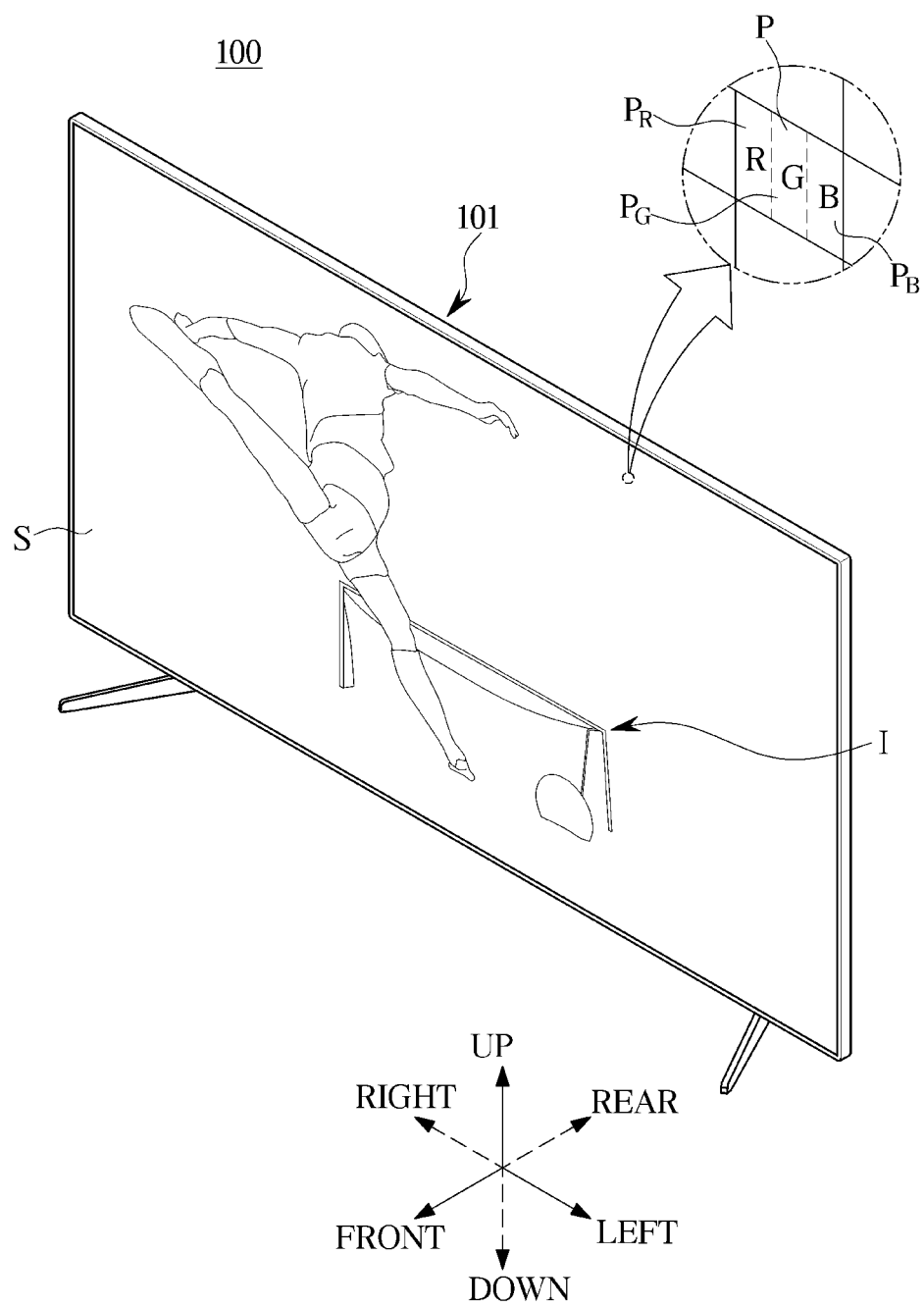
FIG. 1 illustrates an exterior of a display apparatus according to an embodiment.

Like reference numerals throughout the specification denote like elements, and thus their description will be omitted. Also, this specification does not describe all the elements according to embodiments of the disclosure, and descriptions well-known in the art to which the disclosure pertains or overlapped portions are omitted. The terms such as "~part", "~block", "~member", "~unit", and the like may refer to a unit for processing at least one function or act. For example, the terms may refer to at least process processed by at least one hardware or software stored in memories or processors. According to embodiments, a plurality of "~parts", "~blocks", "~members", or "~units" may be embodied as a single element, or a single "~part", "~block", "~member", or "~unit" may include a plurality of elements.

It will be understood that when an element is referred to as being "connected" to another element, it can be directly or indirectly connected to the other element, wherein the indirect connection includes "connection" via a wireless communication network.

It will be further understood that the term "include" when used in this specification, specify the presence of stated elements, but do not preclude the presence or addition of one or more other elements.

It will be further understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms.

It is to be understood that the singular forms include plural references unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to accompanying drawings.

FIG. 1 illustrates an exterior of a display apparatus according to an embodiment.

A display apparatus 100 is a device that processes an image signal received from the outside and visually displays the processed image. Hereinafter, a case in which the display apparatus 100 is a television is exemplified, but it is understood that embodiments are not limited thereto. For example, the display apparatus 100 may be implemented in various forms such as a monitor, a portable multimedia device, a portable communication device, a portable computing device, and the like, but the display apparatus 100 is not limited in its shape as long as it is capable of visually displaying an image.

Also, the display apparatus 100 may be a large format display (LFD) installed outdoors, such as on a roof of a building or at a bus stop. Here, the outdoors is not limited to an open air, and the display apparatus 100 according to an embodiment may be installed in a place where a large number of people come and go, even indoors such as a subway station, a shopping mall, a movie theater, a building, a store, and the like.

The display apparatus 100 may receive a video signal and an audio signal from various content sources, and output a video and an audio corresponding to the video signal and the audio signal. For example, the display apparatus 100 may receive television broadcast content through a broadcast receiving antenna or a wired cable 110a (see, e.g., FIG. 2), content from a content reproduction device, or content from a content providing server of a content provider.

Referring to FIG. 1, the display apparatus 100 may include a body 101 including a plurality of components for displaying an image, and a screen S that is provided on one side of the body 101 to display an image I.

The body 101 may form an outer surface of the display apparatus 100, and include the components to allow the display apparatus 100 to display the image I. Although the body 101 shown in FIG. 1 is in a form of a flat plate, a shape of the body 101 is not limited thereto. For instance, the body 101 may have a shape in which a left end and a right end protrude forward and a central portion thereof is curved so as to be concave.

The screen S is formed on a front surface of the body 101, and may display the image I corresponding to visual information. For example, the screen S may display a still image or a moving image, and further display a two-dimensional plane image or a three-dimensional image.

A plurality of pixels P may be formed on the screen S and the image I displayed on the screen S may be formed by a combination of lights emitted from the plurality of pixels P. For instance, the single image I may be formed on the screen S by combining the lights emitted by the plurality of pixels P like a mosaic.

Each of the plurality of pixels P may emit light of various brightness and various colors.

In order to emit the light of various brightness, each of the plurality of pixels P may include a configuration capable of emitting light directly (e.g. an organic light emitting diode), or a configuration capable of transmitting or blocking light emitted by a backlight unit, or the like (e.g. a liquid crystal panel).

In order to emit the light of various colors, each of the plurality of pixels P may include sub pixels PR, PG and PB.

The sub pixels PR, PG and PB may include a red sub pixel PR that emits red light, a green sub pixel PG that emits green light, and a blue sub pixel PB that emits blue light. Specifically, the red light may represent a light beam having a wavelength of approximately 620 nanometers (nm) to 750 nm, the green light may represent a light beam having a wavelength of approximately 495 nm to 570 nm, and the blue light may represent a light beam having a wavelength of approximately 450 nm to 495 nm.

Each of the plurality of pixels P may emit the light of various brightness and various colors by a combination of the red light of the red sub pixel PR, the green light of the green sub pixel PG and the blue light of the blue sub pixel PB.

Although the screen S shown in FIG. 1 is in a form of a flat plate, a shape of the screen S is not limited thereto. For instance, the screen S may have a shape in which a left end and a right end protrude forward and a central portion is curved so as to be concave according to the shape of the body 101.

The display apparatus 100 may include various types of display panels capable of displaying the image I. For example, the display apparatus 100 may include a liquid crystal display panel (LCD panel), a light emitting diode panel (LED panel), or an organic light emitting diode panel (OLED panel).

Figure 2:
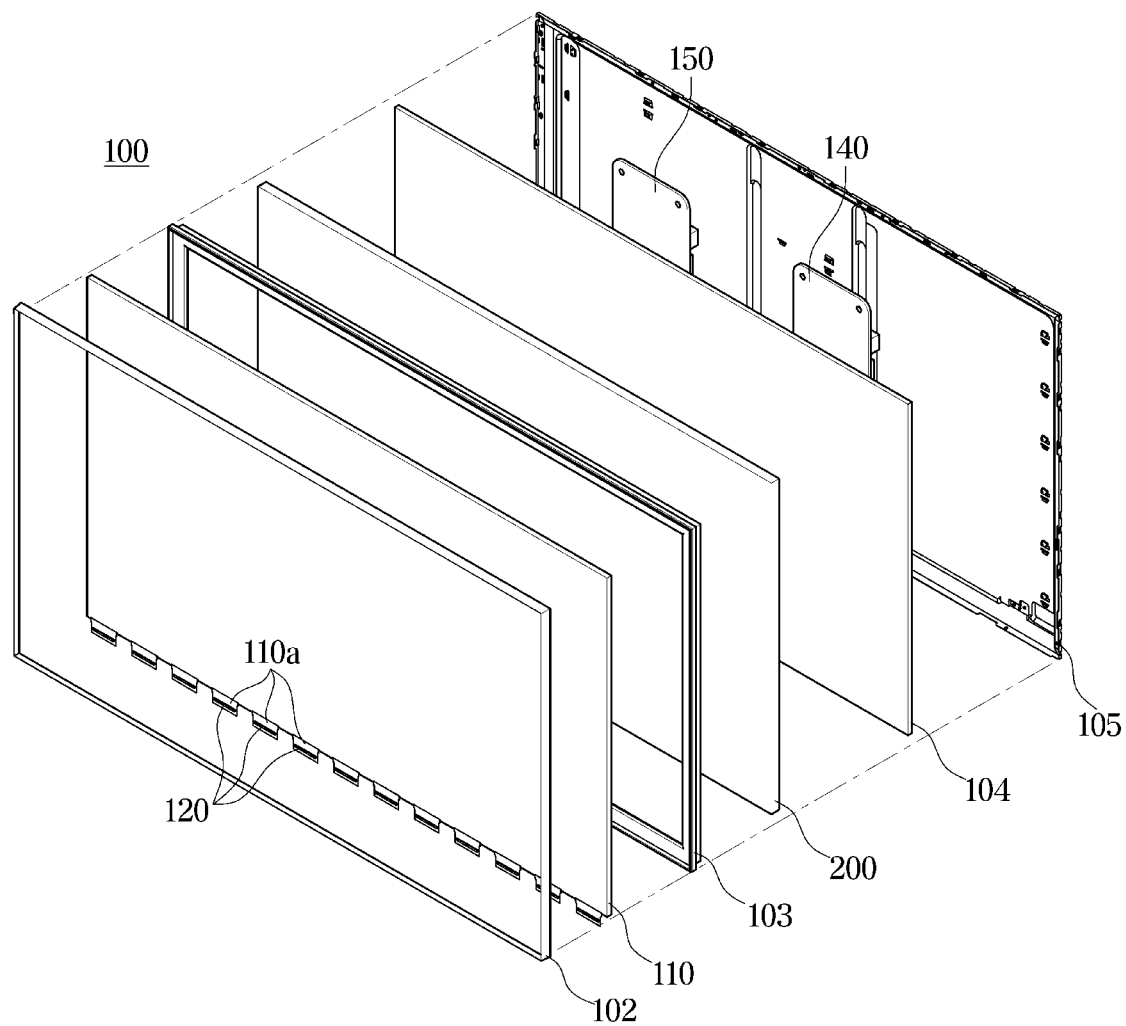
FIG. 2 illustrates an exploded view of a display apparatus according to an embodiment.
Figure 2:
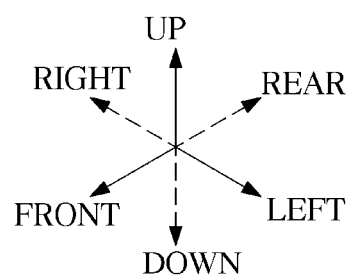

FIG. 2 illustrates an exploded view of the display apparatus 100 according to an embodiment.

Referring to FIG. 2, various components for generating the image I on the screen S may be provided in the body 101.

The body 101 may include a backlight unit 200 emitting surface light forward, a liquid crystal panel 110 transmitting or blocking light emitted from the backlight unit 200, a control assembly 140 controlling operations of the backlight unit 200 and the liquid crystal panel 110, and a power assembly 150 supplying power to the backlight unit 200 and the liquid crystal panel 110. Also, the body 101 may further include a bezel 102, a frame middle mold 103, a bottom chassis 104 and a rear cover 105 to fix and support the liquid crystal panel 110, the backlight unit 200, the control assembly 140 and the power assembly 150.

The backlight unit 200 may include a point light source that emits white light, and may refract, reflect, and scatter light to convert light emitted from the point light source into uniform surface light. The liquid crystal panel 110 is provided in front of the backlight unit 200, and blocks or transmits light emitted from the backlight unit 200 to form the image I.

A front surface of the liquid crystal panel 110 forms the screen S described above, and may include a plurality of pixels P. Each of the plurality of pixels P in the liquid crystal panel 110 may independently block or transmit the light of the backlight unit 200, and the light transmitted by the plurality of pixels P may form the image I to be displayed on the screen S.

The liquid crystal panel 110 may include at least one of a polarizing film, a transparent substrate, a pixel electrode, a thin film transistor (TFT), a liquid crystal layer, a common electrode, or a color filter.

The transparent substrate of the liquid crystal panel 110 may be formed of tempered glass or transparent resin, and fix the pixel electrode, the TFT, the liquid crystal layer, the common electrode, and the color filter. The polarizing film may transmit particular light and block other light. The color filter may include a red filter transmitting red light, a green filter transmitting green light, and a blue filter transmitting blue light, and a region in which the color filter is formed corresponds to the pixel P described above.

The TFT may transmit or block current flowing through the pixel electrode. An electric field may be formed or removed between the pixel electrode and the common electrode in accordance with the turning on (closing) or turning off (opening) of the TFT. The TFT may be composed of a poly-silicon, and be formed by a semiconductor process such as lithography, deposition, or ion implantation process.

The pixel electrode and the common electrode are formed of a conductive metal and may generate an electric field for changing an arrangement of liquid crystal molecules forming the liquid crystal layer. The pixel electrode and the common electrode are formed of a transparent material and may transmit light incident from the outside. For example, the pixel electrode and the common electrode may be formed of indium tin oxide (ITO), indium zinc oxide (IZO), Ag nano wire, a carbon nano tube (CNT), graphene, 3,4-ethylenedioxythiophene (PEDOT), and the like.

The liquid crystal layer is formed between the pixel electrode and the common electrode, and filled with the liquid crystal molecules.

The liquid crystal represents an intermediate state between a solid (crystal) and a liquid. In general, when a solid material is heated, a state of the material changes from a solid state to a transparent liquid state at a melting temperature. On the other hand, when a liquid crystal material in a solid state is heated, the liquid crystal material changes into an opaque and turbid liquid at the melting temperature, and then changes to a transparent liquid state. Most of such liquid crystal materials are organic compounds, and their molecular shapes are elongated and rod-shaped, and an arrangement of molecules is the same as an irregular state in any direction, but may have a regular crystalline form in another direction. As a result, the liquid crystal has both fluidity of liquid and optical anisotropy of crystal (solid).

Also, the liquid crystal may have optical properties depending on a change of the electric field. For instance, a direction of the molecular arrangement of the liquid crystal may change depending on the change of the electric field.

When an electric field is generated in the liquid crystal layer, the liquid crystal molecules of the liquid crystal layer may be arranged in the direction of the electric field. When no electric field is generated in the liquid crystal layer, the liquid crystal molecules may be arranged irregularly or arranged along an alignment layer.

As a result, optical properties of the liquid crystal layer may vary depending on a presence of an electric field passing through the liquid crystal layer. For example, the liquid crystal panel of the disclosure may include a twisted nematic (TV) liquid crystal panel, a vertical alignment (VN) liquid crystal panel and an in-plane-switching (IPS) liquid crystal panel.

Referring again to FIG. 2, a cable 110a transmitting image data to the liquid crystal panel 110 and a display driver integrated circuit (DDI, hereinafter, referred to as a driver IC) 120 processing digital image data and outputting an analog image signal are provided in one side of the liquid crystal panel 110.

The driver IC 120 may receive the image data and power from the control assembly 140/power assembly 150, and transmit the image data and drive current to the liquid crystal panel 110.

The control assembly 140 may include a control circuit to control operations of the liquid crystal panel 110 and the backlight unit 200. The control circuit may process image data received from an external content source, transmit the image data to the liquid crystal panel 110, and transmit dimming data to the backlight unit 200.

The power assembly 150 may supply power to the liquid crystal panel 110 and the backlight unit 200 in order to enable the backlight unit 200 to output surface light and the liquid crystal panel 110 to block or transmit the light of the backlight unit 200.

The control assembly 140 and the power assembly 150 may be implemented as a printed circuit board and various circuits mounted on the printed circuit board. For example, a power circuit may include a condenser, a coil, a resistor, a processor, and the like, and a power circuit board on which these are mounted. Also, the control circuit may include a memory, a processor, and a control circuit board on which these are mounted.

The display apparatus 100 of the disclosure may include various variations in addition to the liquid crystal panel 110 described above. That is, the display apparatus 100 of the disclosure is sufficient as long as it includes the backlight unit 200 described below.

Figure 3A:
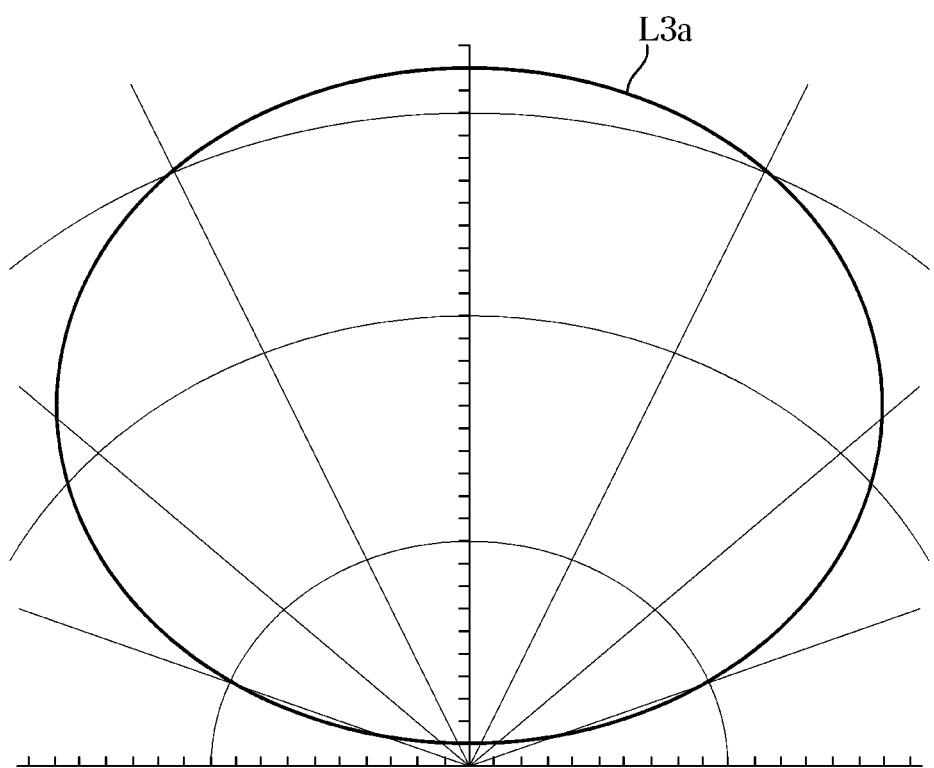
FIGS. 3A and 3B are diagrams illustrating light profiles output by a light source according to an embodiment.
Figure 3B:
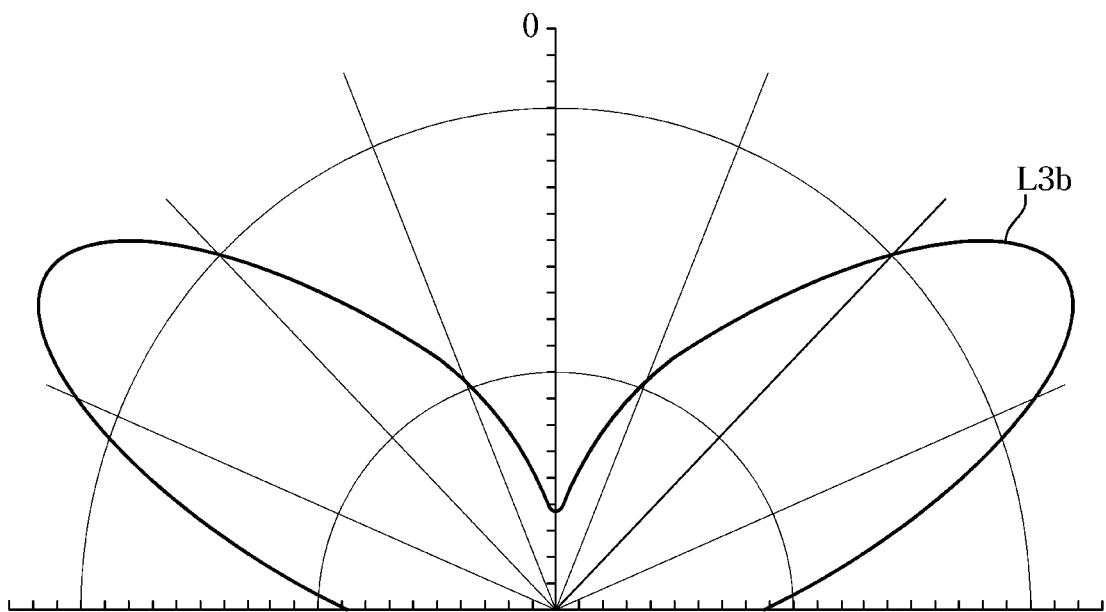

FIGS. 3A and 3B are diagrams illustrating light profiles output by a light source according to an embodiment.

Referring to FIGS. 3A and 3B, a light source provided in the backlight unit 200 may emit Lambertian light L3a.

The Lambertian light L3a may refer to light having the same apparent brightness regardless of an angle from which an observer views.

Meanwhile, a light distribution is required to be evenly formed in order for the backlight unit 200 to be used in the display apparatus 100. When a light source has the light profile L3a as shown in FIG. 3A, a light distribution may not be evenly formed.

Accordingly, the backlight unit 200 of the disclosure may change a view angle as shown in FIG. 3B, with respect to a distribution of Lambertian light from the light source.

According to an embodiment of the disclosure, a light profile L3b as shown in FIG. 3B may be implemented in the backlight unit 200 by applying a multilayer reflector having different reflectances/transmittances depending on an angle of incidence from the light source with respect to the Lambertian light L3a of FIG. 3A.

Also, in a light profile of a light source, the above-described configuration may enable a maximum reflectance with respect to a small angle of incidence that causes a hot spot of backlight, and an increased transmittance as the angle of incidence increases.

In addition, the above-described configuration may enable a uniform light distribution through multi-reflection in the backlight unit 200.

Hereinafter, an operation that may change the light profile of the backlight unit 200 as shown in FIG. 3A to the light profile of FIG. 3B by using a reflective layer is described below.

Figure 4:
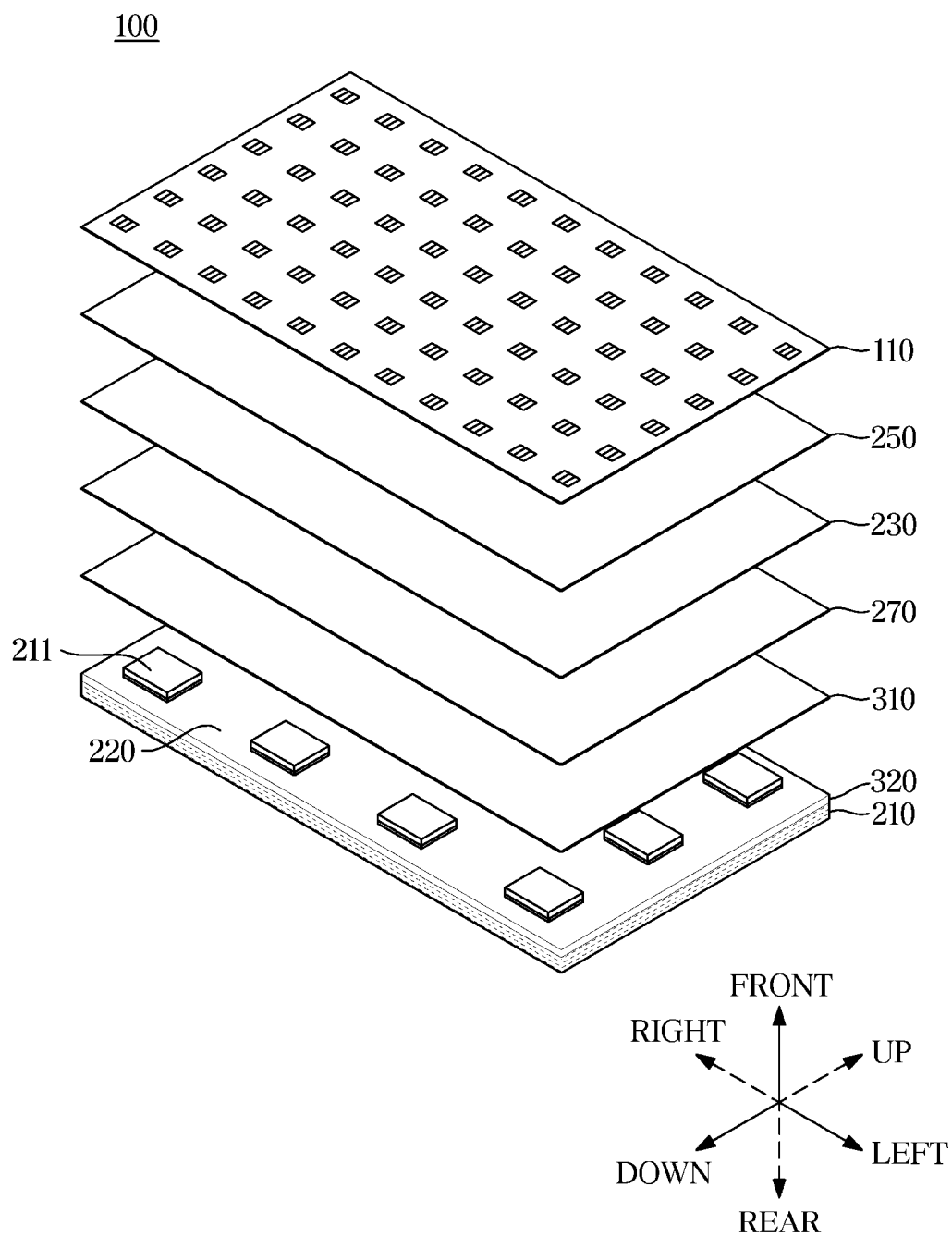
FIG. 4 is a diagram illustrating a configuration of a backlight unit according to an embodiment.

FIG. 4 is a diagram illustrating a configuration of a backlight unit according to an embodiment.

In the display apparatus 100 of the disclosure, the backlight unit 200 is provided at a rear of the liquid crystal panel 110 described above. The backlight unit 200 includes a light source part 210 emitting light from a rear, a converter 230 converting a color of excitation light emitted from the light source part 210, an enhancer 250 improving a brightness of white light emitted through the converter 230, a diffuser 270, a first reflective layer 310 and a second reflective layer 320.

Specifically, in the light source part 210, light sources 211 may be arranged at regular intervals to have uniform brightness.

A direct-type backlight unit in which the light sources 211 are uniformly arranged from a center to sides of a light guide plate 220 is illustrated in FIG. 4.

The converter 230 is provided as a fluorescent substance or quantum dot QD. Also, a wavelength band emitted by the light sources 211 may be divided into excitation light and signal light, and the converter 230 absorbs the excitation light and converts the color of the excitation light. The converter 230 is sufficient as long as it is made of a photoluminescent (PL) material capable of color conversion.

The enhancer 250 includes a thin film device made of at least one of a dye or a pigment that absorbs a predetermined wavelength band, and may reduce a full width at half maximum of the absorbed light.

Then enhancer 250 may further include a sheet for improving brightness of various lights or a uniformity of the brightness, in addition to the thin film device.

For instance, the enhancer 250 may include at least one of a diffusion sheet, a prism sheet, or a reflective polarizing sheet. When light is emitted obliquely from the diffusion sheet, the prism sheet may refract the emitted light again to focus the light. Also, the reflective polarizing sheet may transmit light polarized in a predetermined polarization direction, or reflect light polarized in a direction different from the predetermined polarization direction.

Also, according to an embodiment, the first reflective layer 310 may be provided under the diffuser 270, and the second reflective layer 320 may be provided in the light source part 210. The first reflective layer 310 is described in detail later.

In addition, the backlight unit 200 may be provided with the second reflective layer 320 from which light reflected from the first reflective layer 310 may be reflected again.

Figure 5A:
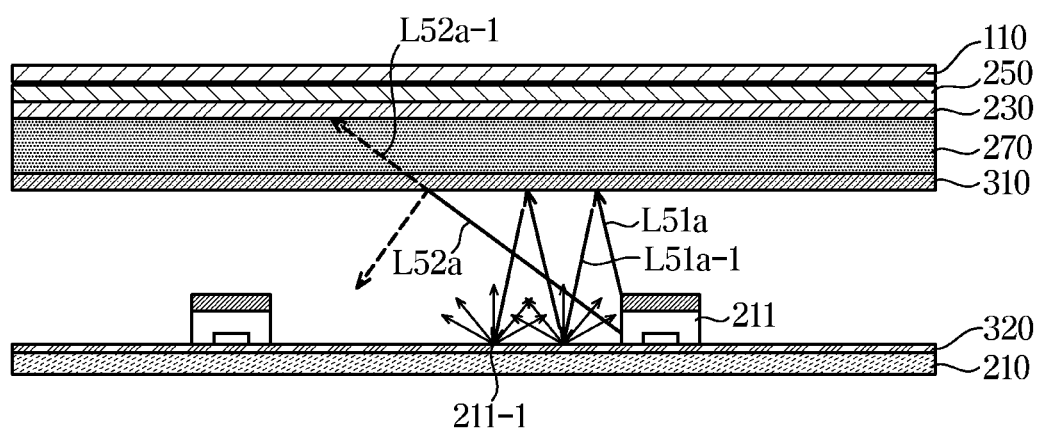
FIGS. 5A and 5B are diagrams illustrating a progress of light inside a backlight unit according to an embodiment.
Figure 5B:
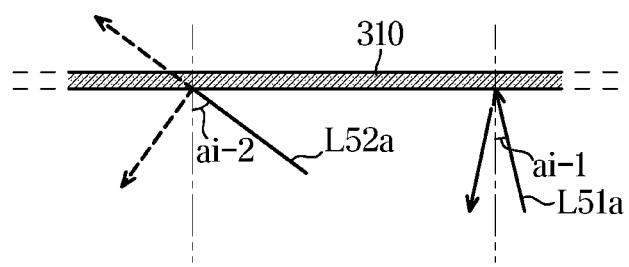

FIG. 5A is a diagram illustrating a progress of light inside a backlight unit according to an embodiment, and FIG. 5B is a diagram illustrating an operation of emitted light reaching the first reflective layer 310.

Referring to FIGS. 4 and 5A together, the first reflective layer 310 is provided under the diffuser 270 and may reflect lights L51a and L52a emitted from a plurality of light sources.

The lights L51a and L52a emitted from the plurality of light sources may refer to light emitted from the light sources 211 forming the light profile described above.

Also, the second reflective layer 320 may reflect the light reflected by the first reflective layer 310.

Light L51a-1 reflected by the first reflective layer 310 may refer to light that has been emitted from the plurality of light sources and then reflected from the first reflective layer 310.

Here, the first reflective layer 310 may be provided so that a portion of the light L51a-1 is reflected and the remaining portion L52a-1 is transmitted based on an angle of incidence with the light emitted from the light source. That is, the backlight unit 200 may be determined to have different amounts of reflection and transmittance according to an angle of incidence of light incident on the first reflective layer 310. Here, the angle of incidence is an angle between the direction of the incident light and the normal to the first reflective layer 310.

Specifically, in the light emitted from the light source part 210, a reflectance may be increased with respect to a narrow angle of incidence to reflect as much light as possible.

The light reflected from the first reflective layer 310 may be reflected again from the second reflective layer 320. The light reflected from the second reflective layer 320 may form Lambertian light at positions between the light sources to form a virtual light source 211-1.

Such light may be reflected again with respect to a narrow incident angle range of the first reflective layer 310. When the light is reflected as above, light from the light sources may form the light profile like FIG. 3B.

The light profile as above may minimize hot spots that may decrease a light distribution uniformity.

Referring to FIGS. 5A and 5B together, when an angle of incidence (ai-1) of the light emitted from the light source is less than a predetermined angle, the light may be reflected.

The predetermined angle may refer to an incident angle at which the amount of reflection of incident light exceeds the amount of transmission. According to an embodiment, the predetermined angle may be determined in a range from 0 to 40 degrees of the incident angle of light, without being limited thereto. In other words, more light may be reflected than transmitted when the incident angle is smaller than the predetermined angle.

When an incident angle (ai-2) of the light exceeds the predetermined angle, the light may be transmitted.

When the incident angle of the light exceeds the predetermined angle, a transmittance of the light may exceed a reflectance.

The above-described predetermined angle may be determined during a manufacture of the first reflective layer 310, which will be described later.

The first reflective layer 310 of the disclosure is provided in a form of a plate in front of the light sources.

Accordingly, the first reflective layer 310 may be formed in front of the light sources without considering a position of the light source. That is, the first reflective layer 310 may be formed so that a lateral positional relationship with at least one light source is independent. In other words, a lateral position of the first reflective layer 310 is independent of a lateral position of the light sources 211.

Figure 6A:
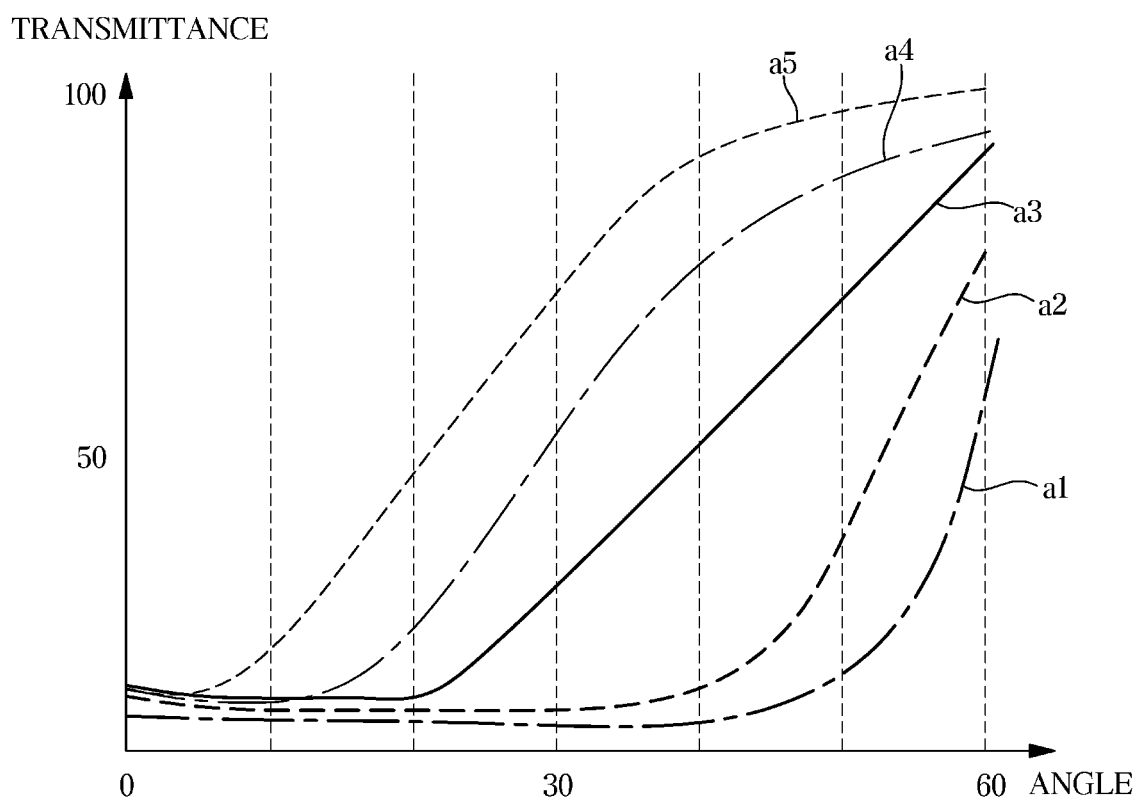
FIG. 6A is a diagram illustrating a light transmittance of a first reflective layer according to an angle of incidence.
Figure 6B:
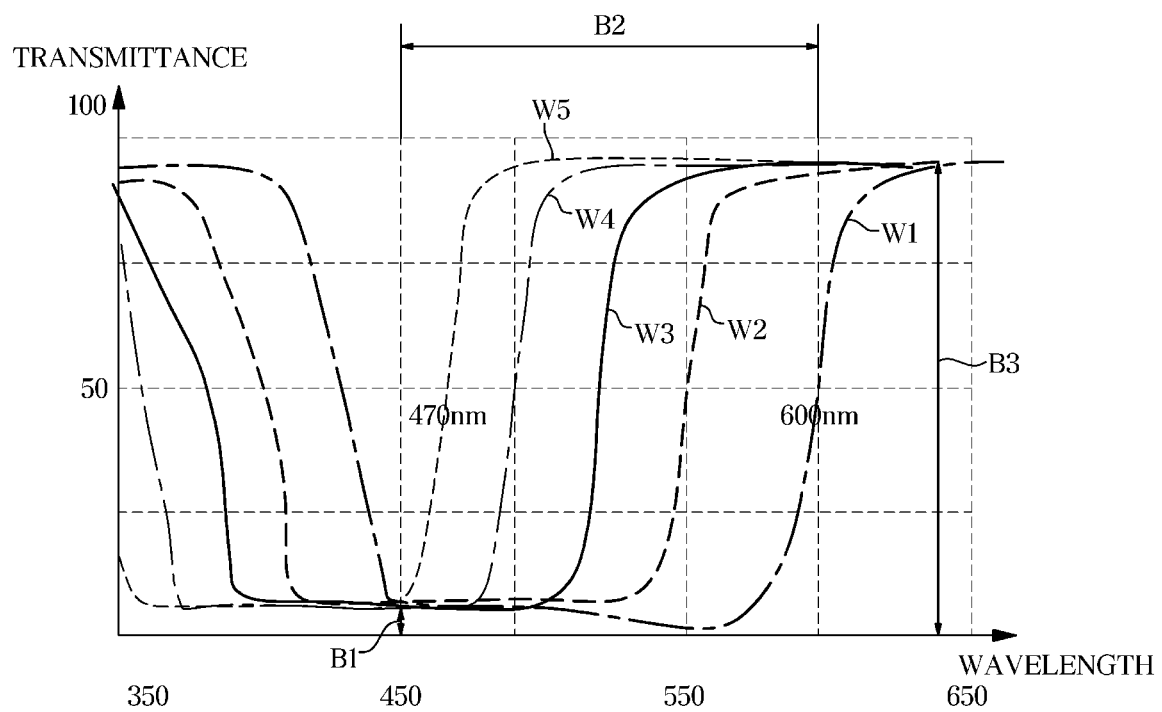
FIG. 6B is a diagram illustrating a light transmittance of a first reflective layer according to a wavelength.

FIG. 6A is a diagram illustrating a light transmittance of a first reflective layer according to an angle of incidence, and FIG. 6B is a diagram illustrating a light transmittance of the first reflective layer according to a wavelength of incident light.

According to an embodiment of the disclosure, the first reflective layer may include a plurality of layers. The plurality of layers may be formed so that light of each predetermined central wavelength is reflected and light of each predetermined surrounding wavelength is transmitted.

Specifically, the first reflective layer may be provided as an angular selective multi-reflection device.

The first reflective layer may be provided as an optimum reflective layer for each incident angle according to a light profile of a light source.

Accordingly, the first reflective layer may use at least one layer having different refractive index and optical thickness with respect to monochromatic light, which is generally known as an optical thin film technology.

Based on the description above, FIG. 6A illustrates transmission characteristics in each case (a1, a2, a3, a4 and a5) where the amount of transmitted light is varied according to an angle of incidence by varying a refractive index and optical thickness of each layer of the first reflective layer with respect to a central wavelength of incident light.

Also, FIG. 6B illustrates wavelength bands in each case (a1, a2, a3, a4 and a5) where the amount of transmitted light is varied according to an angle of incidence by varying the refractive index and optical thickness of each layer of the first reflective layer with respect to the central wavelength of incident light.

The graphs of FIGS. 6A and 6B show reflection and transmission characteristics of light according to the angle of incidence and according to the wavelength band, by varying the refractive index and optical thickness of each layer of the first reflective layer. Referring to FIGS. 6A and 6B together, the first case (a1, w1) shows the characteristics where light in a wavelength range of 600 nm is transmitted and light less than 600 nm is not transmitted. The first case (a1, w1) having such characteristics of wavelength of light shows the characteristics where light incident on the first reflective layer at less than 50 degrees is reflected and light incident on the first reflective layer at 50 degrees or more is transmitted.

The fifth case (a5, w5) shows the characteristics where light in a wavelength range of 470 nm is transmitted and light less than 470 nm is not transmitted. The fifth case (a5, w5) having such characteristics of wavelength of light shows the characteristics where light incident on the first reflective layer at less than 10 degrees is reflected and light incident on the first reflective layer at 10 degrees or more is transmitted.

In each case, a wavelength of light in a region through which light is not transmitted may refer to the central wavelength, and a wavelength of light in a region through which light is transmitted may refer to the surrounding wavelength.

Referring to FIG. 6B, the first reflective layer included in each of the first to fifth cases may identify a band reflection region, a band edge region and a band transmission region based on a wavelength characteristic of a reflective thin film layer.

Specifically, the band reflection region B1 may refer to a region where a reflectance of light at the central wavelength is 80%.

The band edge region B2 may refer to a region, including wavelengths longer than the central wavelength, wherein both reflection and transmission may be made.

Also, the band transmission region B3 may refer to a range of 80% or more of transmittance according to an angle of incidence after the band edge region.

The above-described predetermined angle may be determined based on the band reflection region, the band edge region and the band transmission region described above.

Accordingly, the first reflective layer may be formed so that the predetermined angle is determined based on each central wavelength and each surrounding wavelength.

When the backlight unit 200 is manufactured, a user may determine a reflectance and transmittance of light according to a wavelength characteristic of a light source by using the wavelength characteristic of each reflective thin film layer of the first reflective layer.

Figure 7:
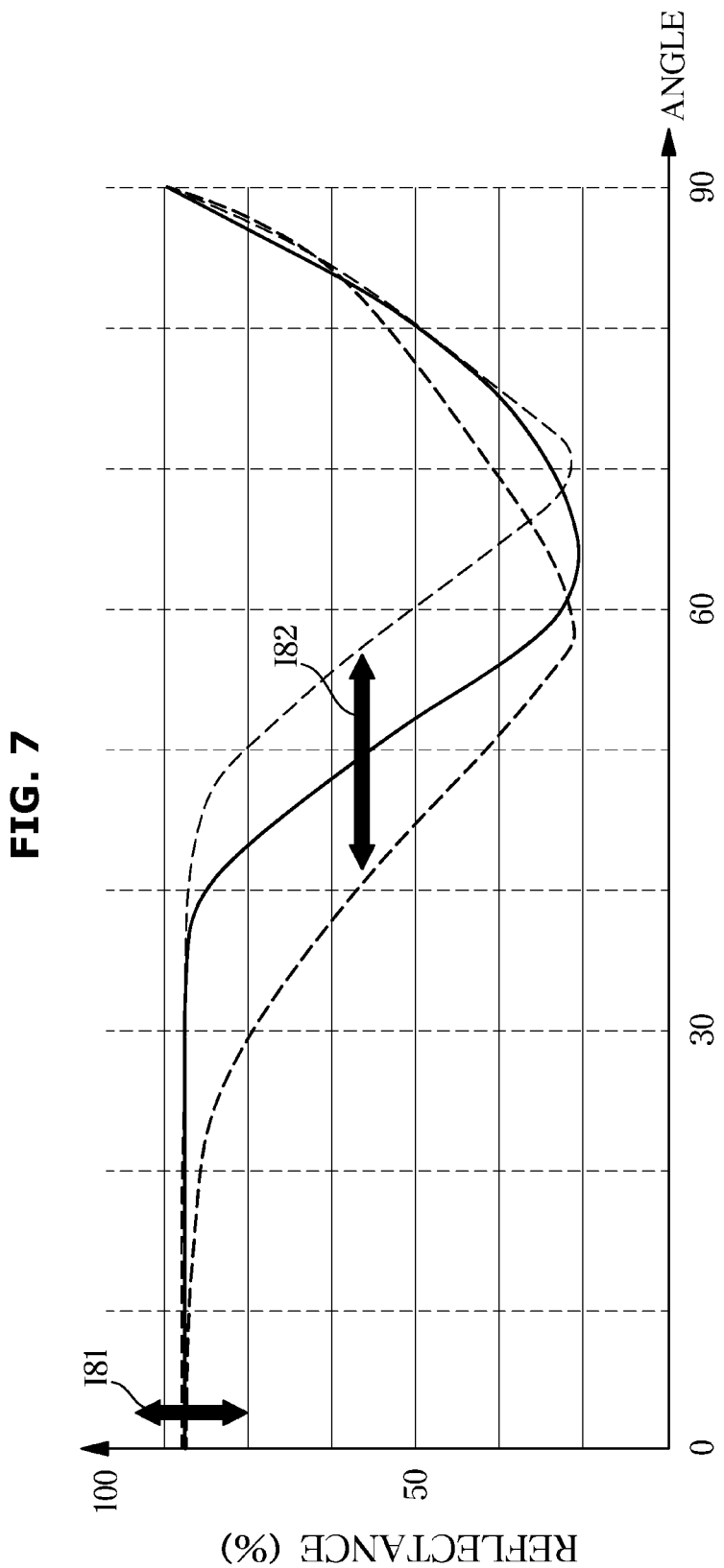
FIG. 7 is a diagram illustrating an operation of defining a bright spot and a dark spot of light distribution and the light distribution according to an embodiment.

FIG. 7 is a graph illustrating a bright spot and a dark spot of light distribution and the light distribution according to an embodiment.

The graph of FIG. 7 shows a reflectance of a first reflective layer according to an angle of incidence of emitted light incident to a plurality of reflective thin film layers of the first reflective layer.

Referring to FIG. 7, a bright spot and a dark spot formed by at least one light source may be identified based on a reflectance 181 of light of the first reflective layer.

Specifically, the first reflective layer may define the reflectance 181 to define the bright spot and the dark spot. The reflectance 181 may refer to a ratio of light emitted from the light source and returned by being reflected from the first reflective layer. Specifically, such region may correspond to the band reflection region described above.

The first reflective layer may define a light distribution formed by the at least one light source based on a light transmission range 182 according to the angle of incidence.

The light transmission range 182 may correspond to the band edge region and the band transmission region described above. The light distribution may refer to a full width at half maximum. Each of the layers of the first reflective layer may define the light distribution by controlling a characteristic corresponding to a wavelength. Determining characteristics of the first reflective layer based on the above description is only an embodiment of the disclosure, and an operation of controlling each of the layers of the first reflective layer to define the reflectance and transmittance according to the angle of incidence of the first reflective layer is not limited.

FIGS. 8A, 8B, 8C and 8D are diagrams illustrating forms of light sources according to an embodiment.

The light source of the disclosure may be provided as a monochromatic (blue) LED chip array on a lower surface of a backlight unit structure.

Specifically, the light sources may be provided as small LED chips (mini/micro LED) which are regularly separated on a semiconductor wafer.

That is, at least one light source may include at least one of a reflective thin film coating, a transparent mold, or a light source reflective layer.

Hereinafter, various forms in which the light source may be provided are described.

Figure 8A:
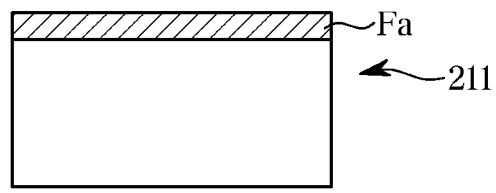
FIGS. 8A, 8B, 8C and 8D are diagrams illustrating forms of light sources according to an embodiment.

Referring to FIG. 8A, the at least one light source 211 may further include a distributed bragg reflection (DBR) layer Fa on an upper surface of a blue light LED through a semiconductor process.

The DBR layer Fa may refer to a coating layer provided to control the dark spot and the bright spot described above more easily.

Figure 8B:
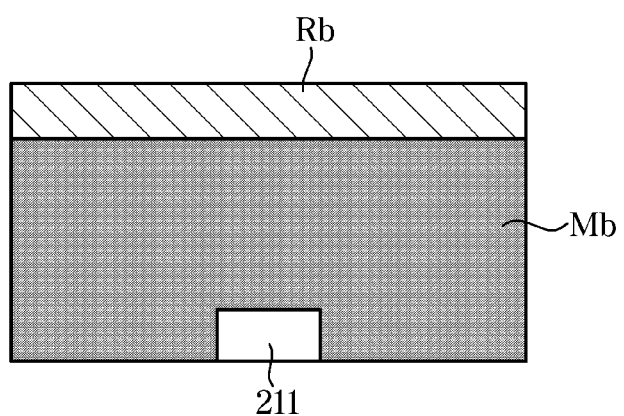
Figure 9A:
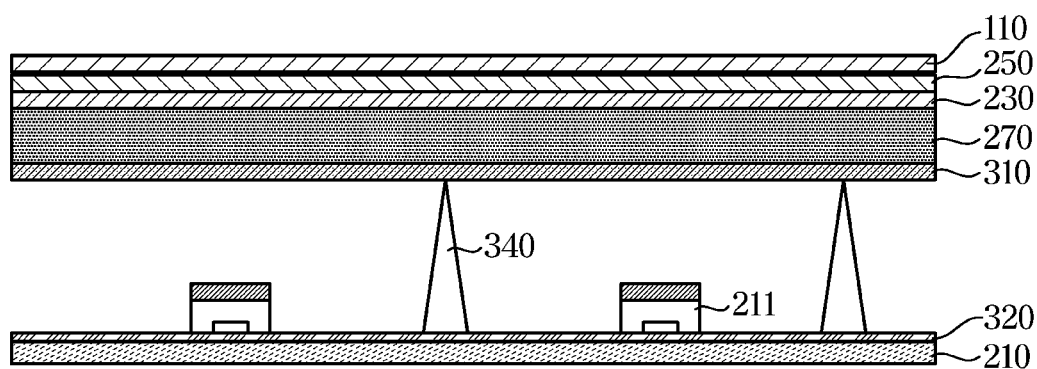
FIGS. 9A, 9B and 9C are diagrams illustrating a backlight unit according to an embodiment.

Referring to FIG. 8B, the light source may be implemented as a transparent material mold Mb and a white ($TiO_2/SiO_2$) reflective layer package Rb on the light source 211 as shown, e.g., in FIG. 9A.

Figure 8C:
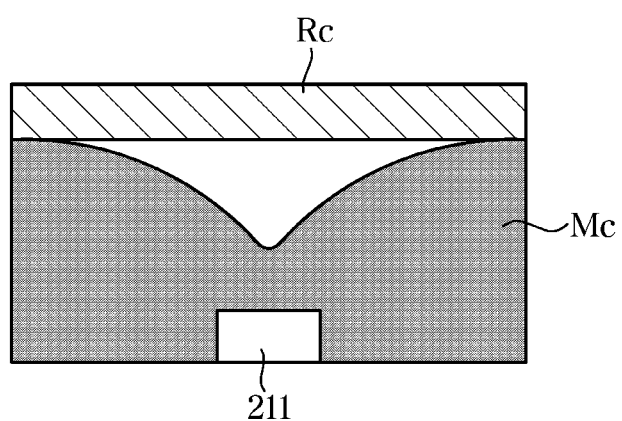
Figure 8D:
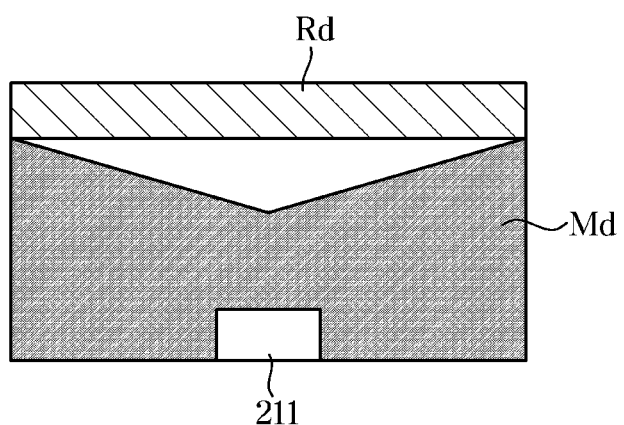

The light source provided as the transparent material mold Mb and the white ($TiO_2/SiO_2$) reflective layer package Rb may be provided in a form shown in FIGS. 8C and 8D.

That is, referring to FIG. 8C, a transparent material of the light source 211 may be provided as a package including an M-shaped transparent mold Mc and a white reflective layer Rc.

Referring to FIG. 8D, a transparent material of the light source 211 may be provided as a package including a V-shaped transparent mold Md and a white reflective layer Rd.

Based on the above-described structure, the light source may form a wider light profile and define a dark spot and a bright spot to form a more even light distribution.

The forms of the light source shown in FIGS. 8A, 8B, 8C and 8D are only embodiments of the disclosure, and a form of a light source that forms a light source package including at least one of the reflective thin film coating, the transparent mold, or the light source reflective layer is not limited.

Figure 9B:
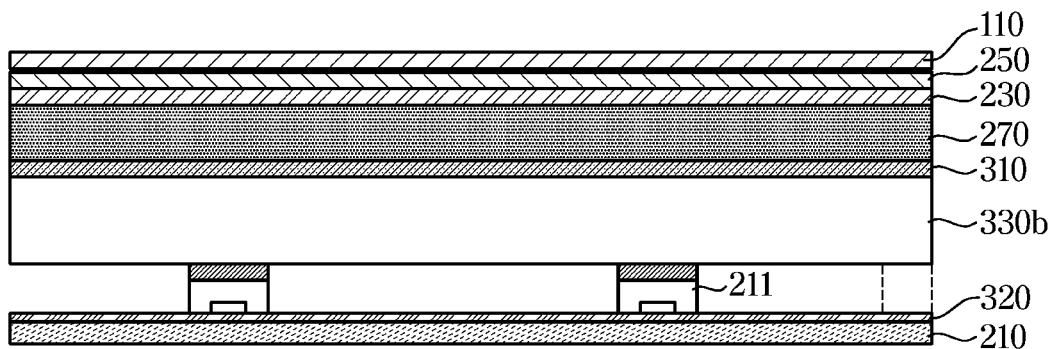
Figure 9C:
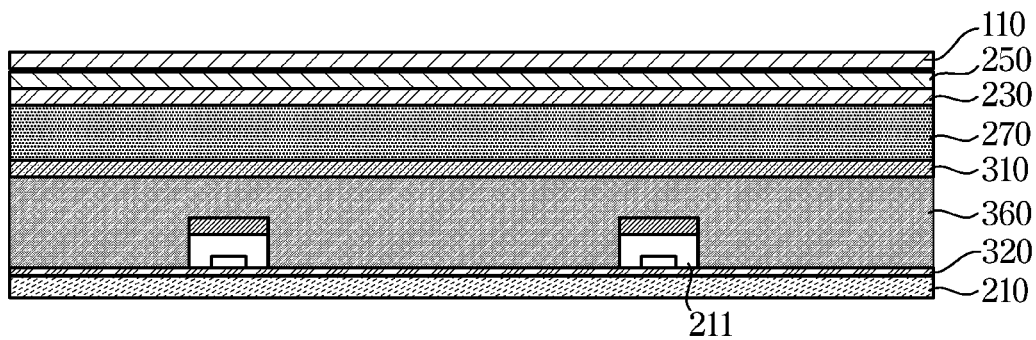

FIGS. 9A, 9B and 9C are diagrams illustrating the backlight unit 200 according to an embodiment.

At least one light source 211 of the backlight unit 200 of the disclosure may be formed between the first reflective layer 310 and the second reflective layer 320. The first reflective layer 310 and the second reflective layer 320 may be connected by a predetermined supporting member 340.

Referring to FIG. 9A, in the backlight unit 200 of the disclosure, a reflectance varies depending on an angular distribution of incident light, and thus the supporting member 340 between the first reflective layer 310 and the second reflective layer 320 including the light source 211 is required.

According to an embodiment, as shown in FIG. 9A, through lamination/protective film treatment of a film including the first reflective layer 310 under the diffuser 270, the wedge-shaped supporting member 340 made of a transparent material may be used without affecting an occurrence of a dark spot and a bright spot.

Referring to FIG. 9B, the first reflective layer 310 is laminated on a thin (1 mm or less) transparent substrate (poly (methyl methacrylate) (PMMA), polycarbonate (PC), etc.) so that a light source package itself may serve as a support. That is, according to another embodiment of the disclosure, the backlight unit 200 may be provided with a thin transparent substrate 330b without a lamination and a separate supporting member.

Referring to FIG. 9C according to still another embodiment, illustrated is the backlight unit 200 formed through an alkali silica reaction (ASR) lamination process with the first reflective layer 310 and including a transparent silicon front mold 360 between the first reflective layer 310 and the second reflective layer 320. According to the embodiment of FIG. 9C, the backlight unit 200 with improved assembly may be formed through a process of laminating the first reflective layer 310 after front molding with the transparent silicon material 360.

The embodiments described with reference to FIGS. 9A, 9B and 9C are only embodiments of the disclosure, and thus a form of supporting between the first reflective layer 310 and the second reflective layer 320 is not limited thereto.

In a related art method of using a diffusion lens for a light source, a slim backlight unit may not be produced due to a size limitation of the lens.

According to embodiments of the disclosure, a short projection distance of light source and a uniform and wide illumination area may be secured.

Specifically, according to embodiments of the disclosure, a monochromatic LED chip or package array having a wide-angle light emission distribution and a diffuser plate integrated structure or a multilayer thin film sheet located thereon with different reflectance/transmittance depending on an angle of incidence are horizontally arranged, and thus illumination uniformity may be secured by minimizing an unbalanced distribution of dark and bright spots even at a short distance.

Further, the number of LEDs may be reduced by increasing a pitch between light sources, thereby reducing cost and increasing productivity.

What is claimed is:

1. A backlight unit comprising:
   a plurality of light sources configured to emit light;
   a first reflective layer configured to reflect the light emitted by the plurality of light sources; and
   a second reflective layer configured to reflect the light reflected from the first reflective layer,
   wherein an amount of reflection from the first reflective layer and an amount of transmission through the first reflective layer are different from each other according to an angle of incidence of light incident on the first reflective layer,
   wherein the amount of reflection is greater than the amount of transmission when the angle of incidence is less than a predetermined angle, wherein the first reflective layer comprises a plurality of layers, and wherein the plurality of layers is configured so that light of a predetermined central wavelength is reflected and light of a predetermined surrounding wavelength is transmitted.

2. The backlight unit of claim 1, wherein the first reflective layer defines a bright spot and a dark spot formed by at least one light source of the plurality of light sources based on the amount of reflection from the first reflective layer.

3. The backlight unit of claim 1, wherein the first reflective layer defines a light distribution formed by the plurality of light sources based on the predetermined angle.

4. The backlight unit of claim 1, wherein the first reflective layer is configured so that the predetermined angle is determined based on the predetermined central wavelength and the predetermined surrounding wavelength.

5. The backlight unit of claim 1, wherein at least one of the plurality of light sources is provided on the second reflective layer, and wherein the second reflective layer is configured to reflect the light reflected from the first reflective layer to form a virtual light source at a position between the plurality of light sources.

6. The backlight unit of claim 1, wherein the plurality of light sources comprise at least one of a reflective thin film coating, a transparent mold, or a light source reflective layer.

7. The backlight unit of claim 1, wherein the plurality of light sources are provided between the first reflective layer and the second reflective layer, and wherein the first reflective layer and the second reflective layer are connected by a supporting member.

8. The backlight unit of claim 1, wherein the first reflective layer is formed so that a lateral position of the first reflective layer is independent of a lateral position of the at least one of the plurality of light sources.

9. A method of manufacturing a backlight unit of a display apparatus, the method comprising:

providing a plurality of light sources configured to emit light between a first reflective layer configured to reflect the light emitted from the plurality of light sources and a second reflective layer configured to reflect the light reflected from the first reflective layer, wherein an amount of reflection from the first reflective layer and an amount of transmission through the first reflective layer are different from each other according to an angle of incidence of light incident on the first reflective layer, wherein the amount of reflection is greater than the amount of transmission when the angle of incidence is less than a predetermined angle, wherein the first reflective layer comprises a plurality of layers, and wherein the plurality of layers is formed so that light of a predetermined central wavelength is reflected and light of a predetermined surrounding wavelength is transmitted.

10. The method of claim 9, wherein the first reflective layer defines a bright spot and a dark spot formed by the at least one of the plurality of light sources based on the amount of reflection from the first reflective layer.

11. The method of claim 9, wherein the first reflective layer defines a light distribution formed by the plurality of light sources based on the predetermined angle.

* * * * *